United States Patent
Bennett et al.

(10) Patent No.: US 9,979,954 B2
(45) Date of Patent: May 22, 2018

(54) EYEWEAR WITH TIME SHARED VIEWING SUPPORTING DELIVERY OF DIFFERING CONTENT TO MULTIPLE VIEWERS

(75) Inventors: James D. Bennett, Hroznetin (CZ); Nambirajan Seshadri, Irvine, CA (US); Jeyhan Karaoguz, Irvine, CA (US); Adil Jagmag, Hollis, NH (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 592 days.

(21) Appl. No.: 12/982,273

(22) Filed: Dec. 30, 2010

(65) Prior Publication Data

US 2011/0169930 A1 Jul. 14, 2011

Related U.S. Application Data (60) Provisional application No. 61/291,818, filed on Dec. 31, 2009, provisional application No. 61/303,119, filed on Feb. 10, 2010.

(51) Int. Cl.
*H04N 13/04* (2006.01)
*H04N 13/00* (2018.01)
(Continued)

(52) U.S. Cl.
CPC ........ *H04N 13/0456* (2013.01); *G03B 35/24* (2013.01); *G06F 3/14* (2013.01);
(Continued)

(58) Field of Classification Search
CPC .................................................. H04N 21/4545
See application file for complete search history.

(56) References Cited

U.S. PATENT DOCUMENTS

| 4,829,365 A | 5/1989 | Eichenlaub |
| 5,493,427 A | 2/1996 | Nomura et al. |

(Continued)

FOREIGN PATENT DOCUMENTS

| EP | 0833183 A1 | 4/1998 |
| EP | 1662808 A1 | 5/2006 |

(Continued)

OTHER PUBLICATIONS

"How browsers work", retrieved from <http://taligarsiel.com/Projects/howbrowserswork1.htm> on Oct. 21, 2010, 54 pages.

(Continued)

*Primary Examiner* — Kevin McInnish
(74) *Attorney, Agent, or Firm* — Sterne, Kessler, Goldstein & Fox P.L.L.C.

(57) ABSTRACT

Systems and methods are provided in which eyewear with time shared viewing is capable of supporting delivery of differing content to multiple viewers/users. The content that is delivered to each viewer includes a respective frame sequence that is displayed on a screen. The frame sequences are mixed when they are displayed on the screen. A lens assembly may be used by each viewer to view the frame sequence that is delivered to that viewer. For instance, a first lens assembly may pass a first frame sequence but not frame sequences other than the first frame sequence. A second lens assembly may pass a second frame sequence but not frame sequences other than the second frame sequence, and so on. The content that is delivered to a viewer may depend on a maturity of the viewer (e.g., whether the viewer's maturity is less than a maturity threshold).

15 Claims, 5 Drawing Sheets

(51) Int. Cl.
*G06F 3/14* (2006.01)
*G09G 3/00* (2006.01)
*G09G 3/20* (2006.01)
*H04N 21/235* (2011.01)
*H04N 21/41* (2011.01)
*H04N 21/435* (2011.01)
*G03B 35/24* (2006.01)
*H04S 7/00* (2006.01)
*G06F 3/0346* (2013.01)
*G02B 6/00* (2006.01)
*G09G 5/00* (2006.01)
*G09G 5/14* (2006.01)

(52) U.S. Cl.
CPC .............. *G09G 3/003* (2013.01); *G09G 3/20* (2013.01); *H04N 13/00* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0413* (2013.01); *H04N 13/0429* (2013.01); *H04N 13/0447* (2013.01); *H04N 13/0454* (2013.01); *H04N 13/0468* (2013.01); *H04N 13/0484* (2013.01); *H04N 13/0497* (2013.01); *H04N 21/235* (2013.01); *H04N 21/4122* (2013.01); *H04N 21/435* (2013.01); *H04S 7/303* (2013.01); *G02B 6/00* (2013.01); *G06F 3/0346* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

(56) References Cited

U.S. PATENT DOCUMENTS

| | | | |
|---|---|---|---|
| 5,615,046 A | 3/1997 | Gilchrist | |
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 | 4/2008 | Jacobs et al. | |
| 7,389,214 B1 | 6/2008 | Yelich et al. | |
| 7,440,193 B2 | 10/2008 | Gunasekaran et al. | |
| 7,511,774 B2 | 3/2009 | Lee et al. | |
| 7,626,644 B2 | 12/2009 | Shestak et al. | |
| 7,646,451 B2 | 1/2010 | Vogel et al. | |
| 7,692,859 B2 | 4/2010 | Redert et al. | |
| 7,885,079 B2 | 2/2011 | Chen et al. | |
| 7,911,442 B2 | 3/2011 | Wang et al. | |
| 7,924,456 B1 | 4/2011 | Kahn et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,044,983 B2 | 10/2011 | Nonaka et al. | |
| 8,049,710 B2 | 11/2011 | Shestak et al. | |
| 8,072,411 B2 | 12/2011 | Chen et al. | |
| 8,139,024 B2 | 3/2012 | Daiku | |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,183,788 B2 | 5/2012 | Ma | |
| 8,209,396 B1 | 6/2012 | Raman et al. | |
| 8,233,034 B2 | 7/2012 | Sharp et al. | |
| 8,284,119 B2 | 10/2012 | Kim et al. | |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,438,601 B2 | 5/2013 | Putterman et al. | |
| 8,441,430 B2 | 5/2013 | Lee | |
| 8,466,869 B2 | 6/2013 | Kobayashi et al. | |
| 8,482,512 B2 | 7/2013 | Adachi et al. | |
| 8,487,863 B2 | 7/2013 | Park et al. | |
| 8,525,942 B2 | 9/2013 | Robinson et al. | |
| 8,587,642 B2 | 11/2013 | Shestak et al. | |
| 8,587,736 B2 | 11/2013 | Kang | |
| 8,605,136 B2 | 12/2013 | Yu et al. | |
| 8,687,042 B2 | 4/2014 | Karaoguz et al. | |
| 8,736,659 B2 | 5/2014 | Liu | |
| 8,766,905 B2 | 7/2014 | Adachi | |
| 8,788,676 B2 | 7/2014 | Alameh et al. | |
| 8,823,782 B2 | 9/2014 | Karaoguz et al. | |
| 8,854,531 B2 | 10/2014 | Karaoguz et al. | |
| 8,885,026 B2 | 11/2014 | Endo | |
| 8,922,545 B2 | 12/2014 | Bennett et al. | |
| 8,964,013 B2 | 2/2015 | Bennett et al. | |
| 8,988,506 B2 | 3/2015 | Bennett et al. | |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2002/0194604 A1 | 12/2002 | Sanchez et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0081302 A1 | 4/2004 | Kim et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1 | 12/2004 | Alden | |
| 2004/0255337 A1 | 12/2004 | Doyle et al. | |
| 2005/0044489 A1* | 2/2005 | Yamagami et al. | 715/517 |
| 2005/0073472 A1 | 4/2005 | Kim et al. | |
| 2005/0128353 A1 | 6/2005 | Young et al. | |
| 2005/0185281 A1 | 8/2005 | Perlin et al. | |
| 2005/0185515 A1 | 8/2005 | Berstis et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0050785 A1 | 3/2006 | Watanabe et al. | |
| 2006/0087556 A1 | 4/2006 | Era | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1 | 11/2006 | Novack et al. | |
| 2007/0002041 A1 | 1/2007 | Kim et al. | |
| 2007/0008406 A1 | 1/2007 | Shestak et al. | |
| 2007/0008620 A1 | 1/2007 | Shestak et al. | |
| 2007/0052807 A1 | 3/2007 | Zhou et al. | |
| 2007/0072674 A1 | 3/2007 | Ohta et al. | |
| 2007/0085814 A1 | 4/2007 | Ijzerman et al. | |

(56) References Cited

U.S. PATENT DOCUMENTS

| | | |
|---|---|---|
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |
| 2007/0147827 A1 | 6/2007 | Sheynman et al. |
| 2007/0153122 A1 | 7/2007 | Ayite et al. |
| 2007/0153916 A1 | 7/2007 | Demircin et al. |
| 2007/0162392 A1 | 7/2007 | McEnroe et al. |
| 2007/0225994 A1 | 9/2007 | Moore |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1* | 10/2009 | Masuda et al. ................. 348/46 |
| 2009/0244266 A1 | 10/2009 | Brigham |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1* | 4/2011 | Shahraray et al. ........... 345/520 |
| 2011/0090413 A1 | 4/2011 | Liou |
| 2011/0093882 A1* | 4/2011 | Candelore et al. ............. 725/28 |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2015/0015668 A1 | 1/2015 | Bennett et al. |

FOREIGN PATENT DOCUMENTS

| | | | |
|---|---|---|---|
| EP | 1816510 A1 | 8/2007 | |
| EP | 1993294 A2 | 11/2008 | |
| GB | 2454771 A * | 5/2009 | ............. H04N 5/783 |
| TW | 200938878 A | 9/2009 | |
| WO | 2005/045488 A1 | 5/2005 | |
| WO | 2007/024118 A1 | 3/2007 | |
| WO | 2008/126557 A1 | 10/2008 | |
| WO | 2009031872 A2 | 3/2009 | |
| WO | 2009/098622 A2 | 8/2009 | |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

(56) References Cited

OTHER PUBLICATIONS

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa, "Stereoscopic Display Technique for Web3D Images", SIGGRAPH 2009, New Orleans, Louisiana, Aug. 3-7, 2009, 1 page.

Fono et al., "EyeWindows: Evaluation of Eye-Controlled Zooming Windows for Focus Selection", CHI 2005, Papers: Eyes on Interaction, Portland, Oregon, Apr. 2-7, 2005, pp. 151-160.

Kumar et al., "Eye Point: Practical Pointing and Selection Using Gaze and Keyboard", CHI 2007, Apr. 28-May 3, 2007, 10 pages.

"Displaying Stereoscopic 3D (S3D) with Intel HD Graphics Processors for Software Developers", Intel, Aug. 2011, pp. 1-10.

Liao, et al.,"The Design and Application of High-Resolution 3D Stereoscopic graphics Display on PC", Purdue University School of Science, 2000, 7 page.

Peterka, "Dynallax: Dynamic Parallax Barrier Autostereoscopic Display", PH.D. Dissertation, University of Illinois at Chicago, (2007), xi, 5, 12-14, and 80-108 pages.

Office Action received for Chinese Patent Application No. 201010619649.3, mailed on Oct. 11, 2014, 5 pages.

\* cited by examiner

EYEWEAR WITH TIME SHARED VIEWING SUPPORTING DELIVERY OF DIFFERING CONTENT TO MULTIPLE VIEWERS

This application claims the benefit of U.S. Provisional Application No. 61/291,818, filed on Dec. 31, 2009, which is incorporated by reference herein in its entirety.

This application also claims the benefit of U.S. Provisional Application No. 61/303,119, filed on Feb. 10, 2010, which is incorporated by reference herein in its entirety.

BACKGROUND OF THE INVENTION

Field of the Invention

The present invention relates to eyewear with time shared viewing.

Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays that produce two-dimensional views (i.e., 2D displays) may be used with a variety of active and passive eyewear to achieve three-dimensional image viewing functionality. Specifically, various types of glasses have been developed that may be worn by viewers to create a three-dimensional effect when viewing a conventional 2D display. One example of such types of glasses include those that utilize color filters to view 2D "anaglyph" video produced on conventional 2D displays. In such case, left eye lenses and right eye lenses receive a corresponding color filter such as red and green or red and cyan. Viewing anaglyph video through such glasses causes each eye to receive differing video. For instance, a left eye covered by a red filtering lens will cause a brain to perceive red as white and cyan as black. Similarly, a right eye covered by a cyan filtering lens will cause the brain to perceive cyan as white and red as black. Thus, with appropriately constructed anaglyph video and such glasses, a conventional display (or screen) can provide a three-dimensional effect.

Other types of passive eyewear include those employing polarization. For example, two polarizing lenses can be placed in a pair of glasses to cover the left and right eyes of a viewer. A first of such polarizing lenses can be placed within the glasses assembly at a polarizing orientation that differs from that of the other polarizing lens. Dual video projection sources, each with a different polarization orientation, can be used to produce a single 2D video on a screen. Such dual source video can then produce a three-dimensional viewing effect for a user wearing such polarized glasses. With linear polarization, a first projection at perhaps a vertical orientation would pass a similarly oriented left eye lens, while a second projection at a horizontal orientation would pass a similarly oriented right eye lens but not vice versa. With circular polarization, a clockwise polarized video projection would be passed by a clockwise polarized left lens while a counter-clockwise polarized right lens would be at least substantially blocked. In such approaches, it can be appreciated that substantially independent video can be received by each of a viewer's eyes.

With either type of passive eyewear (polarizing or color filtering), the lenses of the glasses pass two-dimensional images or video of differing perspective to a viewer's left and right eyes. The images (or video) are combined in the visual center of the brain of the viewer to be perceived as having three-dimensions.

Another approach for accomplishing three-dimensional perception in association with a 2D display involves active eyewear. For instance, synchronized left eye, right eye LC (liquid crystal) shutter glasses may be worn by a viewer for viewing a conventional two-dimensional display to create a three-dimensional viewing illusion. Each lens of the LC shutter glasses acts as an independently controllable LC shutter which can be switched between a mostly transparent state and a mostly blocking state. For the display, often at double the normal frame rate, a sequence of frames (video) is produced with frames that alternate between those intended for the left eye and those intended for the right eye. The LC shutter glasses operate so as to allow left eye intended frames to pass to the left eye while blocking such frames from the right eye, and vice versa. The glasses accomplish this by alternating between a left eye viewing configuration (left lens in a transparent state; right lens in a blocking state) and a right eye viewing configuration (right lens in a transparent state; left lens in a blocking state). At the same time and in synchrony, the display alternately displays left eye, right eye two-dimensional frame images, each such image having a corresponding left eye and right eye perspective using a technique called alternate-frame sequencing. Accordingly, images of a first perspective are passed to the viewer's left eye, and images of a second perspective are passed to the viewer's right eye to create the three-dimensional viewing illusion.

As with passive eyewear, multiple viewers can simultaneously view alternately displayed images that are provided by a 2D display by wearing respective LC shutter glasses.

BRIEF SUMMARY OF THE INVENTION

Methods, systems, and apparatuses are described for eyewear with time shared viewing that is capable of supporting delivery of differing content to multiple viewers substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Overview

Embodiments of the present invention relate to eyewear with time shared viewing that is capable of supporting delivery of differing content to multiple viewers/users. The content that is delivered to each viewer includes a respective frame sequence. Each frame sequence includes a respective subset of images that are displayed on a screen. A lens assembly may be used by each viewer to view the frame sequence that is delivered to that viewer. For instance, a first lens assembly may pass a first frame sequence but not frame sequences other than the first frame sequence. A second lens assembly may pass a second frame sequence but not frame sequences other than the second frame sequence, and so on. The images of the frame sequences are mixed when they are displayed on the screen, and each image is displayed within a designated period of time that corresponds with a refresh rate of the screen. Accordingly, viewing of the differing content is said to be time shared.

In some embodiments, the content that is delivered to a viewer may depend on a maturity of the viewer. For instance, if the maturity of the viewer is greater than a maturity threshold, first content may be delivered to the viewer. If the maturity of the viewer is less than the maturity threshold, second content may be delivered to the viewer. In an embodiment, the second content is a censored version of the first content. For example, if frames that are included in the first content include subject matter that is associated with a content maturity that is greater than the maturity threshold, those frames may be missing from the second content or may be modified to include overlays that obscure the subject matter. Alternatively, the second content may include substitute frames in lieu of those frames.

An exemplary eye-wear architecture is described that is used by a first viewer and a second viewer to selectively display first video content and second video content. The eye-wear architecture includes a screen, display circuitry, and first and second lens assemblies. The first video content includes a first frame sequence, and the second video content includes a second frame sequence. The screen is viewed by the first and second viewers. The display circuitry directs display of the first frame sequence in a first area of the screen, while directing display of the second frame sequence in a second area of the screen. The first and second areas of the screen have an area of overlap. The screen displays a combined video frame sequence in the area of overlap. The combined video frame sequence is constructed by mixing at least part of the first frame sequence within the area of overlap with at least part of the second frame sequence within the area of overlap. The first and second lens assemblies are sized for wear by the respective first and second viewers. The first lens assembly blocks the at least part of the first frame sequence within the area of overlap, while the second lens assembly blocks the at least part of the second frame sequence within the area of overlap.

An exemplary eye-wear system is described that is used by a viewer of a screen in a display system that produces visual representations of a video frame sequence on the screen. The video frame sequence is constructed by mixing a first frame sequence of first video content and a second frame sequence of second video content. The eye-wear system includes a wearable lens assembly and processing circuitry. The wearable lens assembly corresponds to at least one eye of the viewer. The wearable lens assembly is configurable in a first mode to at least attempt to selectively pass the first frame sequence but not the second frame sequence. The wearable lens assembly is configurable in a second mode to at least attempt to selectively pass the second frame sequence but not the first frame sequence. The processing circuitry responds to a control signal to cause configuration of the wearable lens assembly in either the first mode or the second mode.

An exemplary method is described for selectively passing first video content and second video content for perception by a viewer. In accordance with this method, a video frame sequence is received from a specified area of a screen within which a first area of the screen and a second area of the screen overlap. The video frame sequence includes a mixture of at least part of a first frame sequence of the first video content and at least part of a second frame sequence of the second video content. The first frame sequence corresponds to the first area of the screen. The second frame sequence corresponds to the second area of the screen. The at least part of the first frame sequence that is received from the specified area is blocked from being perceived by the viewer, while the at least part of the second frame sequence that is received from the specified area is passed to be perceived by the viewer.

It will be apparent to persons skilled in the relevant art(s) that various changes in form and detail can be made to the embodiments described herein without departing from the spirit and scope of the invention. Thus, the breadth and scope of the present invention should not be limited by any of the embodiments described herein.

III. Exemplary Embodiments

Figure 1:
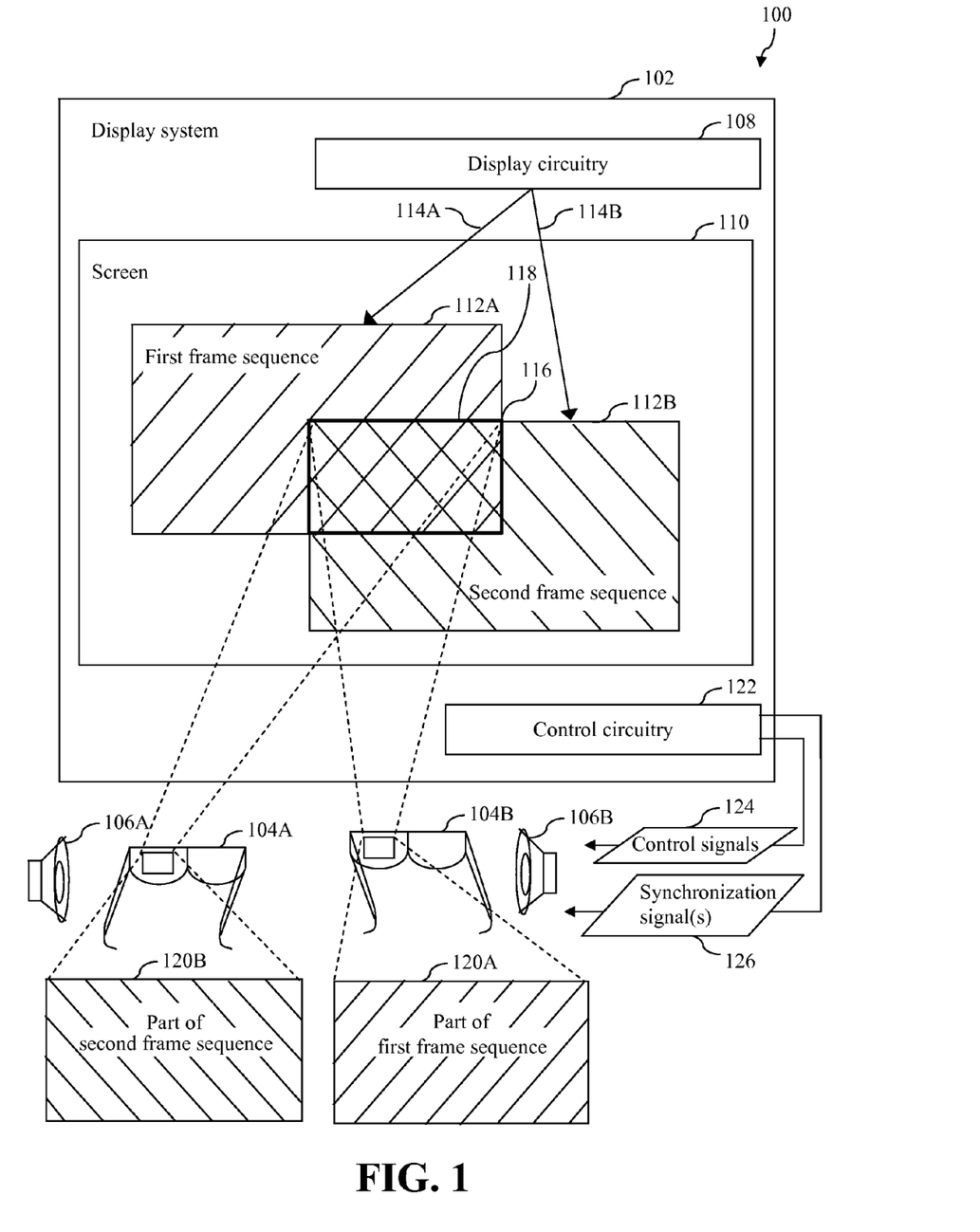
FIG. 1 shows a block diagram of an exemplary eye-wear architecture, according to an embodiment.

Embodiments for eyewear with time shared viewing that is capable of supporting delivery of differing content to multiple viewers may be implemented in a variety of environments. For instance, FIG. 1 shows a block diagram of an exemplary eye-wear architecture 100, according to an embodiment. Eye-wear architecture 100 enables differing content to be provided to respective viewers. As shown in FIG. 1, eye-wear architecture 100 includes a display system 102, first and second lens assemblies 104A and 104B, and first and second speaker assemblies 106A and 106B. The elements of eye-wear architecture 100 are described as follows.

Generally speaking, display system 102 operates to produce visual representations of frame sequences for viewing by respective viewers. Display system 102 may be implemented in various ways. For instance, display system 102 may be a television display (e.g., a liquid crystal display (LCD) television, a plasma television, etc.), a computer monitor, a projection system, or any other type of display system.

Display system 102 includes display circuitry 108, a screen 110, and control circuitry 122. Display circuitry 108 is configured to direct display of a first frame sequence 112A of first video content in a first area of screen 110 and to direct display of a second frame sequence 112B of second video content in a second area of screen 110, as indicated by respective arrows 114A and 114B. It will be recognized that the functionality of display circuitry 108 may be implemented in hardware, software, firmware, or any combination thereof.

In one embodiment, the first frame sequence 112A and the second frame sequence 112B are unrelated. For instance, the first frame sequence 112A may depict a scene from a movie, and the second frame sequence 112B may depict a scene from another movie, a television show, a home video, etc.

In another embodiment, the first frame sequence 112A and the second frame sequence 112B are related. For example, the first frame sequence 112A may depict a scene from a first perspective (a.k.a. viewpoint or orientation), and the second frame sequence 112B may depict the scene from a second perspective. In another example, the second frame sequence 112B may be an altered version of the first frame sequence 112A. For instance, the second frame sequence 112B may include closed captioning and/or overlay(s) (e.g., a picture-in-picture window or other substituted content), and the first frame sequence 112A may not include the closed captioning and/or the overlay(s). The second frame sequence 112B may be a partially fast forwarded, partially rewound, or paused version of the first frame sequence 112A. In accordance with this example, the second frame sequence 112B may be a censored version of the first frame sequence 112A.

Each of the first and second frame sequences 112A and 112B may be configured to be perceived as a sequence of two-dimensional images or as a sequence of three-dimensional images. For example, the first frame sequence 112A may be configured to be perceived as a sequence of two dimensional images, and the second frame sequence 112B may be configured to be perceived as a sequence of three-dimensional images. In accordance with this example, the first frame sequence 112A may include sequential video frames that are configured to be perceived respective two-dimensional images, and the second frame sequence 112B may include second sequential video frames interleaved with third sequential video frames to provide respective frame pairs that are configured to be perceived as respective three-dimensional images.

In another example, the first frame sequence 112A may be configured to be perceived as a sequence of three dimensional images, and the second frame sequence 112B may be configured to be perceived as a sequence of two-dimensional images. In yet another example, the first and second frame sequences 112A and 112B may be configured to be perceived as respective sequences of two-dimensional images. In still another example, the first and second frame sequences 112A and 112B may be configured to be perceived as respective sequences of three-dimensional images.

Screen 110 displays the first frame sequence 112A in the first area and the second frame sequence 112B in the second area. The first area and the second area overlap to provide an area of overlap 118. Part 120A of the first frame sequence 112A and part 120B of the second frame sequence 112B mix to provide a combined frame sequence 116 in the area of overlap 118. For instance, portions of part 120A are alternately mixed with portions of part 120B. Each portion includes one or more frames. The number of frames in each portion may be constant or may vary. In one example, part 120A and part 120B may be alternately mixed frame-by-frame. Screen 110 may be any suitable type of screen, including an LCD screen, a plasma screen, a light emitting device (LED) screen (e.g., an OLED (organic LED) screen), etc.

Control circuitry 122 is configured to generate control signals 124 for respective first and second lens assemblies 104A and 104B and/or respective first and second speaker assemblies 106A and 106B. The control signal for each lens assembly (or speaker assembly) indicates a mode in which that lens assembly (or speaker assembly) is to be configured. For example, a first mode may indicate that a lens assembly is to pass the part 120A of the first frame sequence 112A within the area of overlap 118 and block the part 120B of the second frame sequence 112B within the area of overlap 118. In accordance with this example, the first mode may indicate that a speaker assembly is to pass first audio that corresponds to the part 120A of the first frame sequence 112A within the area of overlap 118 but not pass second audio that corresponds to the part 120B of the second frame sequence 112B within the area of overlap 118. In another example, another mode may indicate that a lens assembly is to pass the part 120B of the second frame sequence 112B within the area of overlap 118 and block the part 120A of the first frame sequence 112A within the area of overlap 118. In accordance with this example, the second mode may indicate that a speaker assembly is to pass the second audio but not the first audio.

Control circuitry 122 may be further configured to generate synchronization signal(s) 126 that indicate timing information regarding a refresh rate of display system 102. For instance, the synchronization signal(s) may enable first and second lens assemblies 104A and 104B and/or first and second speaker assemblies 106A and 106B to synchronize with the refresh rate. The timing information may be of any suitable format. For example, the timing information may specify a reference time at which a refresh of display system 102 occurred, along with information that specifies the refresh rate. In another example, the timing information may specify multiple times at which respective refreshes of display system 102 occurred. In accordance with this example, the refresh rate of display system 102 may be derived based on the multiple times. It will be recognized that the functionality of control circuitry 122 may be implemented in hardware, software, firmware, or any combination thereof.

Each of the control signals 124 and synchronization signal(s) 126 may be provided to any one or more of first lens assembly 104A, second lens assembly 104B, first speaker assembly 106A, and second speaker assembly 106B wirelessly or via a wired connection. Moreover, it will be recognized that control circuitry 122 need not necessarily generate or provide synchronization signal(s). For example, any one or more of first lens assembly 104A, second lens assembly 104B, first speaker assembly 106A, and second speaker assembly 106B may determine the refresh rate of display system 102 based on an analysis of times at which images are displayed by screen 110. In accordance with this example, a period of time between successive images may be determined, and the refresh rate may be determined based on the period of time.

First lens assembly 104A is sized to be worn by a first viewer for viewing images on screen 110. First lens assembly 104A synchronizes with the refresh rate of display system 102 based on the synchronization signal(s) 126 to facilitate the viewing of the images.

First lens assembly 104A is configurable in any of a variety of modes for selectively passing specified frame sequences for perception by the first viewer based on a first control signal of the control signals 124. For example, if the first control signal indicates a first mode, first lens assembly 104A may pass the part 120A of the first frame sequence 112A within the area of overlap 118 and block the part 120B of the second frame sequence 112B within the area of overlap 118. In accordance with this example, first lens assembly 104A may enable the first viewer to view the first frame sequence 112A without viewing any of the second frame sequence 112B. In another example, if the first control signal indicates a second mode, first lens assembly 104A may pass the part 120B of the second frame sequence 112B within the area of overlap 118 and block the part 120A of the first frame sequence 112A within the area of overlap 118. In accordance with this example, first lens assembly 104A may enable the first viewer to view the second frame sequence 112B without viewing any of the first frame sequence 112A.

First speaker assembly 106A is configured to provide audio that corresponds to images that are passed to the first viewer by first lens assembly 104A. First speaker assembly 106A synchronizes with the refresh rate of display system 102 based on the synchronization signal(s) 126. First speaker assembly 106A is configurable in any of a variety of modes for selectively passing audio that corresponds to specified frame sequences based on the first control signal of the control signals 124. For example, if the first control signal indicates the first mode, first speaker assembly 106A may pass first audio that corresponds to the part 120A of the first frame sequence 112A but not second audio that corresponds to the part 120B of the second frame sequence 112B. In another example, if the first control signal indicates the second mode, first speaker assembly 106A may pass the second audio but not the first audio. First speaker assembly 106A is shown to be separate from first lens assembly 104A for illustrative purposes and is not intended to be limiting. It will be recognized that first lens assembly 104A may include first speaker assembly 106A.

Second lens assembly 104B is configurable in any of a variety of modes for selectively passing specified frame sequences for perception by the second viewer based on a second control signal of the control signals 124. For example, if the second control signal indicates the first mode, second lens assembly 104B may pass the part 120A of the first frame sequence 112A within the area of overlap 118 and block the part 120B of the second frame sequence 112B within the area of overlap 118. In another example, if the second control signal indicates the second mode, second lens assembly 104B may pass the part 120B of the second frame sequence 112B within the area of overlap 118 and block the part 120A of the first frame sequence 112A within the area of overlap 118.

Second speaker assembly 106B is configured to provide audio that corresponds to images that are passed to the second viewer by second lens assembly 104B. Second speaker assembly 106B synchronizes with the refresh rate of display system 102 based on the synchronization signal(s) 126. Second speaker assembly 106B is configurable in any of a variety of modes for selectively passing audio that corresponds to specified frame sequences based on the second control signal of the control signals 124. For example, if the second control signal indicates the first mode, second speaker assembly 106B may pass the first audio, which corresponds to the part 120A of the first frame sequence 112A, but not the second audio, which corresponds to the part 120B of the second frame sequence 112B. In another example, if the second control signal indicates the second mode, second speaker assembly 106B may pass the second audio but not the first audio. Second speaker assembly 106B is shown to be separate from second lens assembly 104B for illustrative purposes and is not intended to be limiting. It will be recognized that second lens assembly 104B may include second speaker assembly 106B.

Persons skilled in the relevant art(s) will recognize that configuration of first lens assembly 104A and/or second lens assembly 104B in a specified mode may not provide a flawless viewing and/or listening experience for the respective viewer(s). For example, if a lens assembly 104A or 104B attempts to pass the part 120A of the first frame sequence 112A within the area of overlap 118 and to block the part 120B of the second frame sequence 112B within the area of overlap 118 in accordance with the first mode, it is possible that the lens assembly 104A or 104B may unintentionally block a portion of the part 120A and/or unintentionally pass a portion of the part 120B. Moreover, if a speaker assembly 106A or 106B attempts to pass the first audio, which corresponds to the part 120A of the first frame sequence 112A, but not the second audio, which corresponds to the part 120B of the second frame sequence 112B, in accordance with the first mode, it is possible that the speaker assembly 106A or 106B may unintentionally pass a portion of the second audio and/or unintentionally not pass a portion of the first audio.

In another example, if a lens assembly 104A or 104B attempts to pass the part 120B of the second frame sequence 112B within the area of overlap 118 and to block the part 120A of the first frame sequence 112A within the area of overlap 118 in accordance with the second mode, it is possible that the lens assembly 104A or 104B may unintentionally block a portion of the part 120B and/or unintentionally pass a portion of the part 120A. Moreover, if a speaker assembly 106A or 106B attempts to pass the second audio but not the first audio in accordance with the second mode, it is possible that the speaker assembly 106A or 106B may unintentionally pass a portion of the first audio and/or unintentionally not pass a portion of the second audio.

Combined frame sequence 116 is shown in FIG. 1 to include parts 120A and 120B of respective first and second frame sequences 112A and 112B for illustrative purposes and is not intended to be limiting. It will be recognized that combined frame sequence 116 may include the entire first frame sequence 112A and/or the entire second frame sequence 112B.

Eye-wear architecture 100 is shown to include two lens assemblies 104A and 104B and two speaker assemblies 106A and 106B for illustrative purposes and is not intended to be limiting. Eye-wear architecture 100 may include any number of lens assemblies and/or speaker assemblies. The number of speaker assemblies need not necessarily be the same as the number of lens assemblies. For example, one or more lens assemblies may not have a corresponding speaker assembly.

Figure 2:
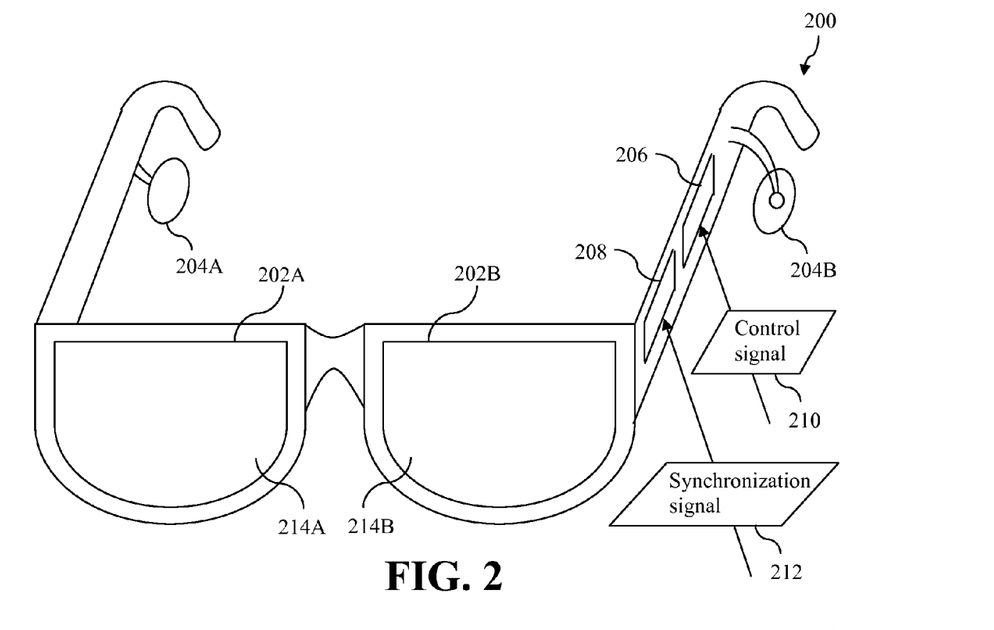
FIG. 2 shows an exemplary wearable lens assembly, according to an embodiment.

Lens assemblies (e.g., first and second lens assemblies 104A and 104B) may have any suitable configuration. For instance, FIG. 2 shows an exemplary wearable lens assembly 200, according to an embodiment. As shown in FIG. 1, lens assembly 200 includes first and second lenses 202A and 202B, first and second speakers 204A and 204B, processing circuitry 206, and tracking circuitry 208. The elements of lens assembly 200 are described as follows.

First and second lenses 202A and 202B correspond to respective right and left eyes of a viewer. First lens 202A selectively passes images to the viewer's right eye. Second lens 202B selectively passes images to the viewer's left eye. First and second lenses 202A and 202B include glass that contains liquid crystal and respective polarization filters 214A and 214B. Polarization filters 214A and 214B are controllable to place respective lenses 202A and 202B in a substantially transparent state or in a substantially opaque state. When the lenses 202A and 202B are in the substantially transparent state, polarization filters 214A and 214B are configured to pass images to be perceived by the viewer's right and left eyes. When the lenses 202A and 202B are in the substantially opaque state, polarization filters 214A and 214B are configured to block the images from being perceived by the viewer's right and left eyes. The state of the filters 214A and 214B changes at times that correspond to a refresh rate of a display (e.g., display 102) from which the images are received.

First and second speakers 204A and 204B correspond to respective right and left ears of the viewer. Speakers 204A and 204B enable the viewer to hear audio that corresponds to images that are passed by first lens 202A and/or second lens 202B. For instance, speakers 204A and 204B may enable the viewer to hear the audio that is associated with the images that are passed to the viewer without hearing audio that is associated with images that are passed to other viewers.

Processing circuitry 206 controls polarization filters 214A and 214B to place the respective first and second lenses 202A and 202B in the substantially transparent state or the substantially opaque state in accordance with a mode that is indicated by control signal 210. In one example, processing circuitry may control the polarization filters 214A and 214B to place the respective first and second lenses 202A and 202B in the substantially opaque state by applying a voltage that exceeds a threshold to the lenses 202A and 202B. In accordance with this example, application of the voltage causes the lenses 202A and 202B to darken such that the viewer is not able to view images through lenses 202A and 202B. In further accordance with this example, processing circuitry 206 may control the polarization filters 214A and 214B to place the respective lenses 202A and 202B in the substantially transparent state by not applying a voltage that exceeds the threshold to the lenses 202A and 202B. The lenses 202A and 202B therefore do not darken to prevent the viewer from viewing images through the lenses 202A and 202B.

In another example, processing circuitry may control the polarization filters 214A and 214B to place the respective first and second lenses 202A and 202B in the substantially transparent state by applying a voltage that exceeds a threshold to the lenses 202A and 202B. In response to the voltage being applied, lenses 202A and 202B do not darken to prevent the viewer from viewing images through the lenses 202A and 202B. In accordance with this example, processing circuitry 206 may control the polarization filters 214A and 214B to place the respective lenses 202A and 202B in the substantially opaque state by not applying a voltage that exceeds the threshold to the lenses 202A and 202B. Application of the voltage therefore causes the lenses 202A and 202B to darken such that the viewer is not able to view images through lenses 202A and 202B. It will be recognized that the functionality of processing circuitry 206 may be implemented in hardware, software, firmware, or any combination thereof.

In accordance with an embodiment, if the control signal 210 indicates a first mode, processing circuitry 206 configures first and second lenses 202A and 202B to pass a first frame sequence but not a second frame sequence. Processing circuitry 206 configures both the first and second lenses 202A and 202B to be in the substantially transparent state for time periods during which frames of the first frame sequence are displayed by the display. Processing module 206 configures both the first and second lenses 202A and 202B to be in the substantially opaque state for time periods during which frames of the second frame sequence are displayed by the display.

In accordance with another embodiment, if the control signal 210 indicates a second mode, processing circuitry 206 configures first and second lenses 202A and 202B to pass the second frame sequence but not the first frame sequence. Processing module 206 configures both the first and second lenses 202A and 202B to be in the substantially opaque state for time periods during which frames of the first frame sequence are displayed by the display. Processing circuitry 206 configures both the first and second lenses 202A and 202B to be in the substantially transparent state for time periods during which frames of the second frame sequence are displayed by the display.

A mode that is indicated by control signal 210 may correspond to any one or more of a variety of viewing scenarios. In a first viewing scenario, two or more viewers view the same 2D content in a first screen region: with both eye lenses of all pairs of glasses being transparent. In accordance with this viewing scenario, a conventional, single 2D frame sequence is generated in the first screen region. If the first region is a single full screen region, the frame rate may be a typical 24-30 frames per second or higher, for example.

In a second viewing scenario, a first viewer (or first group of viewers) views first 2D content in a second screen region, and a second viewer (or second group of viewers) view second 2D content in the second screen region. Both lenses of first glasses together are configured to be substantially transparent while both lenses of second glasses together are configured to be substantially opaque, and vice versa. While lenses of the first glasses are configured to be transparent, the second screen region displays an image frame of the first content. Likewise, while lenses of the second glasses are configured to be transparent, the second screen region displays an image frame of the second content. Display of the image frames may occur at approximately twice a conventional frame rate, and brightness may be reduced by approximately fifty percent. To counter this, regional brightness (brightness associated with the second region only) may be increased to match that of the first region.

In a third viewing scenario, a first viewer (or first viewer group) views 3D content in a third region, and a second viewer (or second viewer group) views 2D content in the third region. The 2D content is one perspective, corresponding to a respective camera, of the 3D content. The first viewer (group) glasses alternate between left eye lens and right eye lens being substantially transparent, while each of the second viewer (group) glasses alternate between both (i.e., left and right) lenses being substantially opaque and both lenses being substantially transparent. Switching between the first and second viewers (groups) may occur at substantially twice a conventional frame rate.

In a fourth viewing scenario, a first viewer (or first viewer group) views 3D content in a fourth region, and a second viewer (or second viewer group) views 2D content in the fourth region. The 2D content is independent of the 3D content. The first viewer (group) glasses alternate between left eye lens only being substantially transparent, right eye lens only being substantially transparent, and both being substantially opaque, while the second viewer (group) glasses alternate between both lenses being substantially opaque, both lenses being substantially opaque, and both lenses being substantially transparent. Correspondingly, video frame sequences may involve cycling between a left eye 3D frame, right eye 3D frame, and both eye 2D frame. The frame rate may be increased overall to approximately three times a conventional frame rate, for example. Regional brightness might also be adjusted to counter the 33% duty cycle in this scenario versus the 50% duty cycle in the third scenario described above.

In a fifth scenario, a first viewer (or first viewer group) views first 3D content in a fifth region, and a second viewer (or second viewer group) views second 3D content in the fifth region. The first viewer (group) glasses alternate between left eye lens only being substantially transparent, both lenses being substantially opaque, right eye lens only being substantially transparent, and both lenses being substantially opaque, while the second viewer (group) glasses alternate between both lenses being substantially opaque, left eye lens only being substantially transparent, both lenses being substantially opaque, and right eye lens only being substantially transparent. The 25% duty cycle may justify increased brightness and a frame rate that is approximately four times a conventional frame rate. It will be recognized that the five scenarios described above may all be regional, full-screen, present with other(s) of the scenarios, etc.

In some embodiments, the control signal 210 specifies a maturity that is associated with the viewer. In accordance with these embodiments, processing circuitry 206 configures the first and second lenses 202A and 202B and/or the first and second speakers 204A and 204B based on the specified maturity. For example, processing circuitry 206 may configure the first and second lenses 202A and 202B and/or the first and second speakers 204A and 204B in the first mode in response to the specified maturity being greater than a maturity threshold. In another example, processing circuitry 206 may configure the first and second lenses 202A and 202B and/or the first and second speakers 204A and 204B in the second mode in response to the specified maturity being less than the maturity threshold. Processing circuitry 206 may configure the first and second lenses 202A and 202B and/or the first and second speakers 204A and 204B among any number of modes based on any number of maturity thresholds. For instance, each maturity threshold may correspond to a respective viewer age range.

Polarization filters (e.g., polarization filters 214A and 214B) may be implemented as any suitable type of active or passive filters. For example, with regard to the discussion of the five scenarios above, red filters may be used for left eye lenses and cyan filters may be used for right eye lenses for both the first viewer (group) glasses and the second viewer (group) glasses. In accordance with this example, the first or second scenarios described above may be utilized with anaglyph video to produce a three-dimensional experience.

In another example, linear or circular polarization may be used with regard to an LC shutter construct. With dual, simultaneous polarized video, a three-dimensional experience may be realized when performing the first or second scenario described above.

In yet another example, both color filtering and polarization techniques may be combined with an LC shutter construct to support more viewer groups (beyond two) that are able to simultaneously view different content at the same time, or to provide a lesser duty cycle, a lesser frame rate, a lesser brightness requirement, etc.

Tracking circuitry 208 synchronizes the configurations of the first and second lenses 202A and 202B and/or the first and second speakers 204A and 204B with the refresh rate of the display (e.g., display 102) from which the images are received based on synchronization signal 212. In an example, synchronization signal 212 may be received wirelessly (e.g., via a Bluetooth® pathway) or via a wired connection. In another example, the synchronization signal 212 may be inherent from the images that are displayed by the display. In accordance with this example, tracking circuitry 208 may derive the synchronization signal 212 from the images. For instance, synching and tracking may be performed automatically by a built-in photodetector or photodetector array system. Lens assembly 200 may include a manual toggle (not shown) to switch between left and right eyes of the viewer. It will be recognized that the functionality of tracking circuitry 208 may be implemented in hardware, software, firmware, or any combination thereof.

Lens assembly 200 is shown to include two lenses 202A and 202B for illustrative purposes and is not intended to be limiting. It will be recognized that lens assembly 200 may include any suitable number of lenses. For instance, lens assembly 200 may include a single lens that corresponds to the viewer's eye(s). Moreover, lens assembly 200 is shown to include two speakers 204A and 204B for illustrative purposes. It will be further recognized that lens assembly 200 may include any suitable number of speakers. For instance, lens assembly may include one speaker or no speakers. Lens assembly 200 may optionally include a microphone to enable the viewer to interact with the display from which the images are received using voice commands. Furthermore, lens assembly 200 is capable of supporting any conventional 2D projection system (e.g., a digital light Processing® (DLP) system, a movie theater projection system, etc.), any conventional 2D television or monitor, and any other suitable projection and/or display system.

Figure 3:
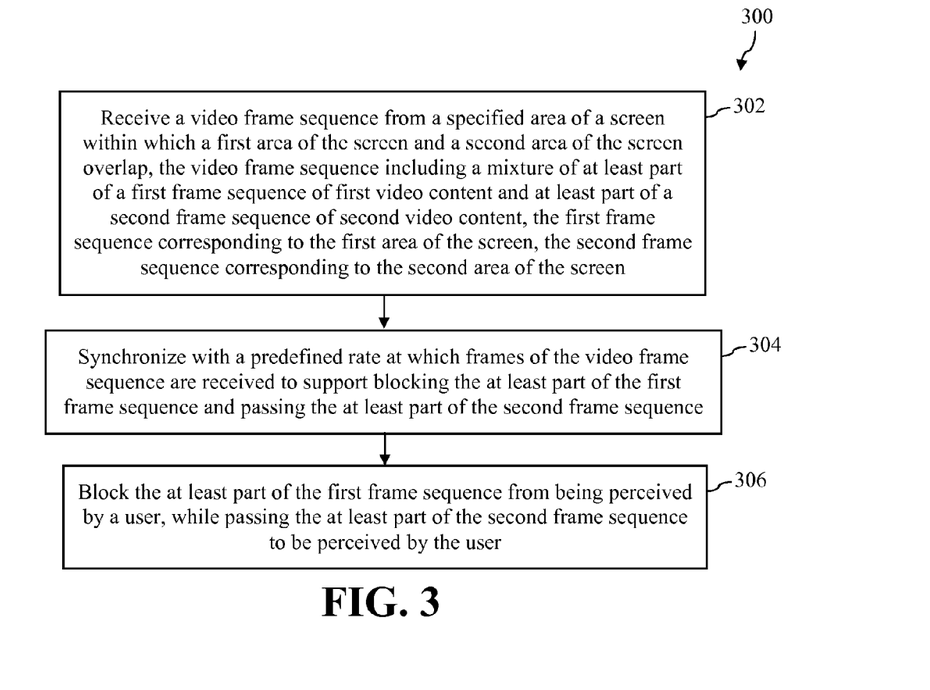
FIGS. 3 and 4 show flowcharts of exemplary methods for selectively passing first video content and second video content for perception by a viewer, according to embodiments.
Figure 4:
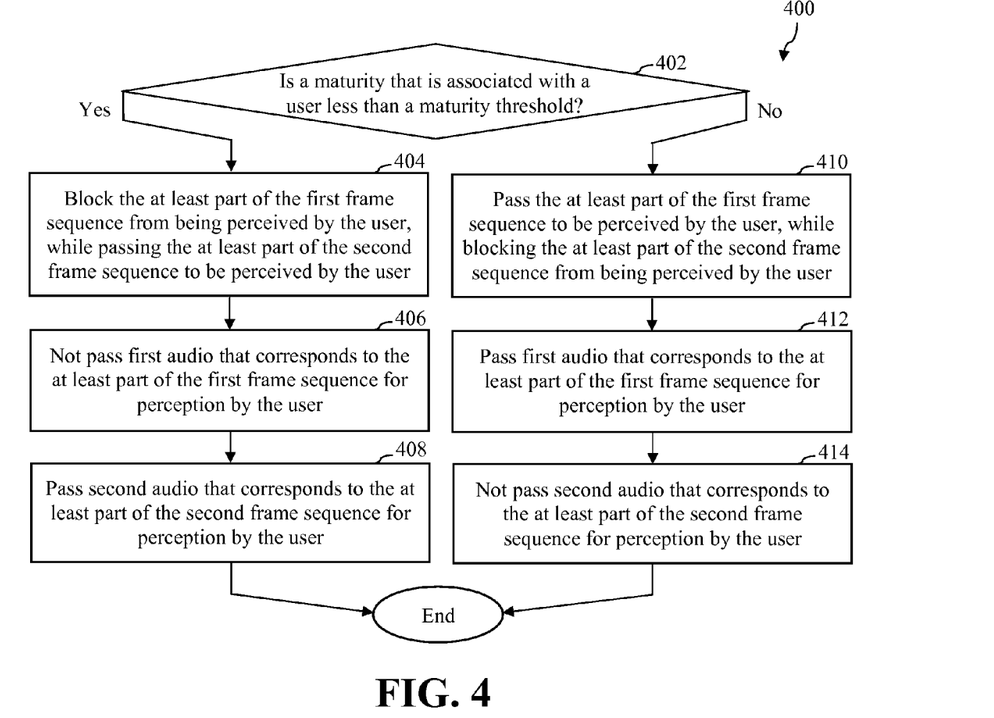

Content may be delivered to users in a variety of ways. For instance, FIGS. 3 and 4 show flowcharts 300 and 400 of exemplary methods for selectively passing first video content and second video content for perception by a viewer, according to embodiments. Flowcharts 300 and 400 may be performed by lens assembly 200 shown in FIG. 2, for example. However the methods of flowcharts 300 and 400 are not limited to that embodiment. Further structural and operational embodiments will be apparent to persons skilled in the relevant art(s) based on the discussion regarding flowcharts 300 and 400. Flowcharts 300 and 400 are described as follows.

Flowchart 300 begins with step 302. In step 302, a video frame sequence is received from a specified area of a screen within which a first area of the screen and a second area of the screen overlap. The video frame sequence includes a mixture of at least part of a first frame sequence of first video content and at least part of a second frame sequence of second video content. The first frame sequence corresponds to the first area of the screen. The second frame sequence corresponds to the second area of the screen. For instance, as described above with respect to FIG. 2, lenses 202A and 202B receive a video frame sequence (e.g., combined frame sequence 116 of FIG. 1) from a specified area of a screen (e.g., area of overlap 118 of screen 110).

At step 304, synchronization with a predefined rate at which frames of the video frame sequence are received is performed to support blocking the at least part of the first frame sequence and passing the at least part of the second frame sequence. For instance, tracking circuitry 208 synchronizes with a predefined rate at which frames of the video frame sequence are received.

At step 306, the at least part of the first frame sequence is blocked from being perceived by a user, while the at least part of the second frame sequence is passed to be perceived by the user. For instance, lenses 202A and 202B may block the at least part of the first frame sequence from being perceived by a user, while passing the at least part of the second frame sequence to be perceived by the user.

In some embodiments, one or more steps 302, 304, and/or 306 of flowchart 300 may not be performed. Moreover, steps in addition to or in lieu of steps 302, 304, and/or 306 may be performed.

Flowchart 400 begins with step 402. In step 402, a determination is made whether a maturity that is associated with a user is less than a maturity threshold. If the maturity that is associated with the user is less than the maturity threshold, flow continues to step 404. Otherwise, flow continues to step 406. For instance, as described above with respect to FIG. 2, processing circuitry 206 determines whether the maturity of a user is less than a maturity threshold.

At step 404, the at least part of the first frame sequence is blocked from being perceived by the user, while the at least part of the second frame sequence is passed to be perceived by the user. For instance, lenses 202A and 202B may block the at least part of the first frame sequence from being perceived by the user, while passing the at least part of the second frame sequence to be perceived by the user. The second frame sequence may be a censored version of the first frame sequence, though the embodiments are not limited in this respect.

At step 406, first audio that corresponds to the at least part of the first frame sequence is not passed for perception by the user. For instance, speakers 204A and 204B may not pass the first audio for perception by the user.

At step 408, second audio that corresponds to the at least part of the second frame sequence is passed for perception by the user. For instance, speakers 204A and 204B may pass the second audio for perception by the user. The second audio may be a censored version of the first audio, though the embodiments are not limited in this respect. Upon completion of step 408, flowchart 400 ends.

At step 410, the at least part of the first frame sequence is passed to be perceived by the user, while the at least part of the second frame sequence is blocked from being perceived by the user. For instance, lenses 202A and 202B may pass the at least part of the first frame sequence to be perceived by the user, while blocking the at least part of the second frame sequence from being perceived by the user.

At step 412, first audio that corresponds to the at least part of the first frame sequence is passed for perception by the user. For instance, speakers 204A and 204B may pass the first audio for perception by the user.

At step 414, second audio that corresponds to the at least part of the second frame sequence is not passed for perception by the user. For instance, speakers 204A and 204B may not pass the second audio for perception by the user. Upon completion of step 414, flowchart 400 ends.

In some embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed.

Figure 5:
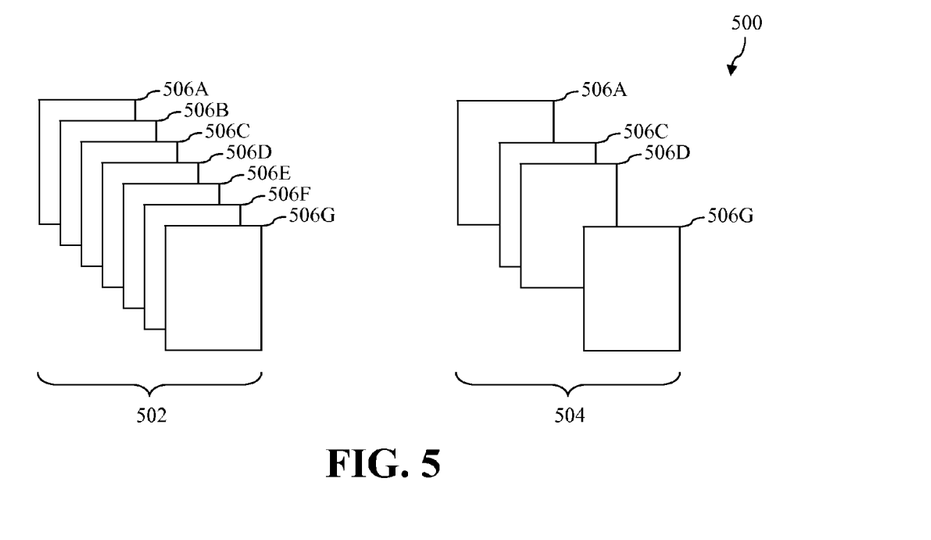
FIGS. 5-7 illustrate ways in which a frame sequence may be censored, according to embodiments.
Figure 6:
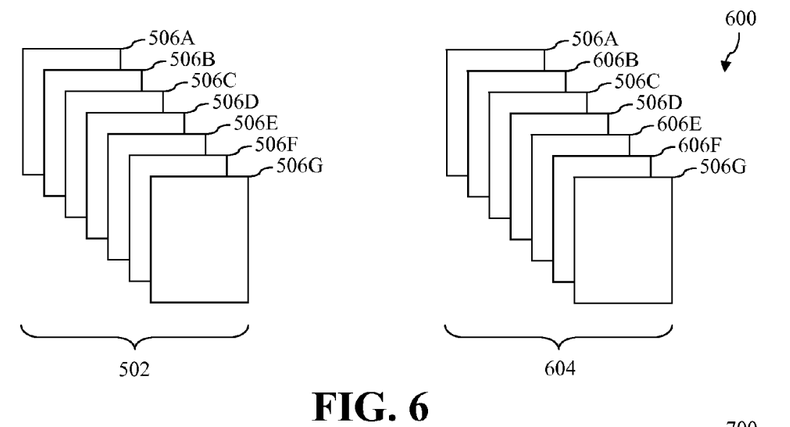
Figure 7:
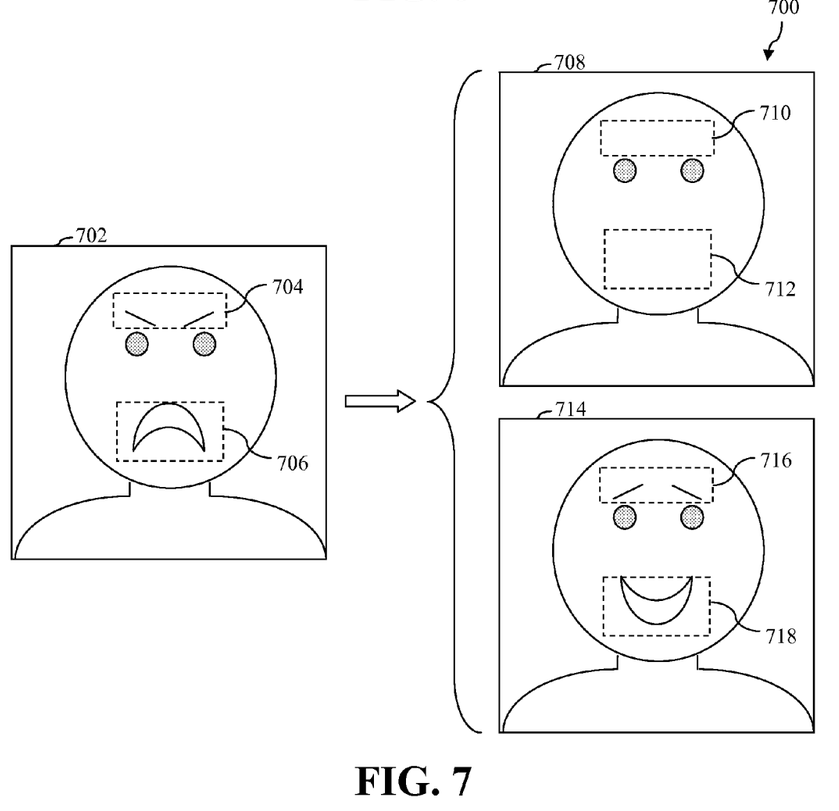

FIGS. 5-7 illustrate ways in which a frame sequence may be censored, according to embodiments. As shown in FIG. 5, a first frame sequence 502 includes sequential frames 506A-506G. A second frame sequence 504 is a censored version of first frame sequence 502. Second frame sequence 504 includes frames 506A, 506C, 506D, and 506G. Frames 506B, 506E, and 506F are missing from second frame sequence 504. For example, frames 506B, 506E, and 506F may include subject matter that is associated with a content maturity that is greater than a maturity threshold.

As shown in FIG. 6, first frame sequence 502 is again shown to include sequential frames 506A-506G. A second frame sequence 604 is a censored version of first frame sequence 502. Second frame sequence 604 includes sequential frames 506A, 606B, 506C, 506D, 606E, 606F, and 506G. Frames 506B, 506E, and 506F of first frame sequence 502 are replaced with frames 606B, 606E, and 606F in second frame sequence 604. For example, frames 506B, 506E, and 506F may include subject matter that is associated with a content maturity that is greater than a maturity threshold.

As shown in FIG. 7, a frame 702 of a first frame sequence includes first subject matter 704 and second subject matter 706. Overlays may be added to frame 702 to obscure first subject matter 704 and second subject matter 706 to provide a corresponding frame of a second frame sequence. Each of frames 708 and 714 is an exemplary frame of a second frame sequence that is a censored version of frame 702.

Frame 708 includes overlays 710 and 712 to obscure first subject matter 704 and second subject matter 706, respectively. Overlays 710 and 712 are shown to include no replacement subject matter for purposes of illustration. Accordingly, first subject matter 704 and second subject matter 706 are effectively erased from frame 708.

Frame 714 includes overlays 716 and 718 to obscure first subject matter 704 and second subject matter 706, respectively. Each of the overlays 716 and 718 is shown to include replacement subject matter. For instance, overlay 716 includes first substitute subject matter in lieu of subject matter 704. Overlay 718 includes second substitute subject matter in lieu of subject matter 706.

Overlays, such as overlays 710, 712, 716, and 718, may be provided to a viewer in any suitable manner. For example, a child's full version of a 2D movie and an adult's full version of a 2D movie may be interlaced on a frame by frame basis, with both eye lenses of each of the adult group glasses switching between being substantially transparent and being substantially opaque, and both eye lenses of each of the child group glasses switching between being substantially opaque and being substantially transparent. The adult group glasses and the child group glasses each experience a 50% duty cycle and/or an increased overall brightness.

In another example, both child and adult group glasses operate with no duty cycle in a substantially transparent state, with a relatively lesser brightness until a mature element appears. Once the mature element appears and for the duration of such element, a 50% duty cycle switch may occur along with relatively greater brightness, such that subject matter appropriate for children (i.e., subject matter that does not include the mature element) is delivered to the child and subject matter that includes the mature element is delivered to the adult.

In yet another example, child group glasses include polarizers that accept light only in one orientation, and adult group glasses have a different polarization than that of the child group glasses. Dual overlapping polarized video production may be performed, such that first polarized video is produced for the child group glasses and second polarized video is produced for the adult group glasses.

In still another example, child group glasses may include polarizers, and an adult group may have no glasses. A first projector or display may send full screen (with a regional black area) first light polarized in alignment with that of the child group glasses for "family rated" video portions of content. A second projector or display may send second light polarized out of alignment with that of the child group glasses to the regional black area left vacant by the first light.

Figure 8:
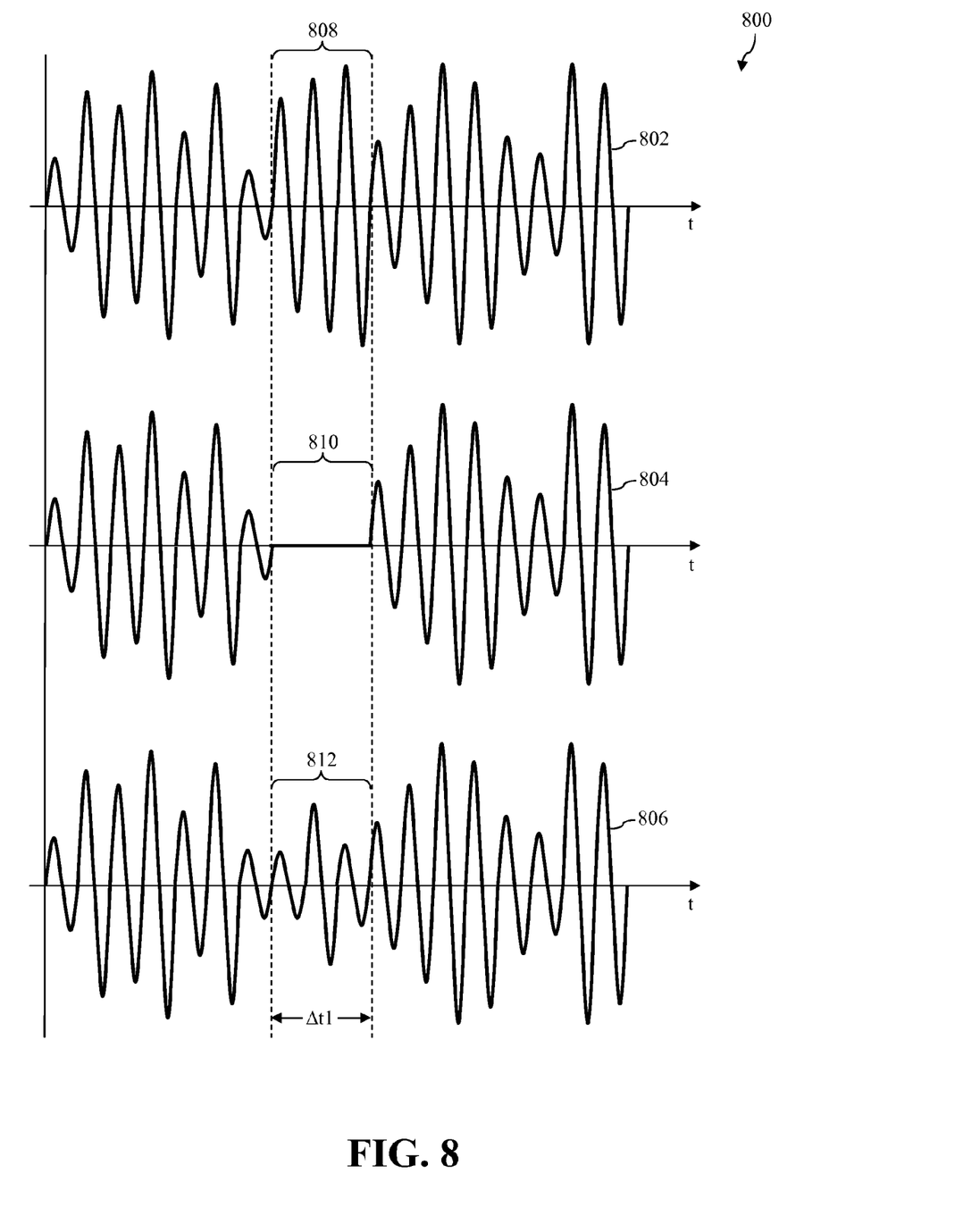
FIG. 8 illustrates ways in which audio that corresponds to a frame sequence may be censored, according to an embodiment.

FIG. 8 illustrates ways in which audio that corresponds to a frame sequence may be censored, according to an embodiment. Waveform 802 represents first audio that corresponds to a first frame sequence. Waveform 802 includes a portion 808 that is associated with specified subject matter. Each of waveforms 804 and 806 is an exemplary representation of second audio that is a censored version of the first audio.

Waveform 804 is the same as waveform 802, except that waveform 804 is missing portion 808 of waveform 802, as depicted by portion 810. The magnitude of waveform 804 is substantially zero for the duration Δt1 of portion 810. Accordingly, no audio is passed to a user with respect to portion 810.

Waveform 806 is the same as waveform 802, except that waveform 806 includes a portion 812 rather than portion 808. In one embodiment, portion 812 includes substitute audio in lieu of the portion of the first audio that is represented by portion 808 of waveform 802. In another embodiment, portion 812 includes supplemental audio (e.g., a continuous or periodic tone, static, or an advisory notice) in addition to the portion of the first audio that is represented by portion 808 to provide the portion of the second audio that is represented by portion 812. For example, the supplemental audio may be included to hinder perception of the portion of the first audio that is represented by portion 808.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An eye-wear architecture used by a first viewer and a second viewer to selectively display first video content and second video content, the eye-wear architecture comprising:
   a screen being viewed by the first viewer and the second viewer;
   display circuitry directing display of a first frame sequence of the first video content in a first area of the screen, while directing display of a second frame sequence of the second video content in a second area of the screen, and the first area of the screen and the second area of the screen having an area of overlap and having areas that do not overlap;
   the screen displaying a combined video frame sequence in the area of overlap, the combined video frame sequence being constructed by mixing at least part of the first frame sequence within the area of overlap with at least part of the second frame sequence within the area of overlap;
   a first lens assembly sized for wear by the first viewer;
   a second lens assembly sized for wear by the second viewer; and
   the first lens assembly blocking the at least part of the first frame sequence within the area of overlap, while the second lens assembly blocks the at least part of the second frame sequence within the area of overlap.

2. The eye-wear architecture of claim 1, wherein the first lens assembly blocks the at least part of the first frame sequence within the area of overlap and passes the at least part of the second frame sequence within the area of overlap, while the second lens assembly blocks the at least part of the second frame sequence within the area of overlap and passes the at least part of the first frame sequence within the area of overlap.

3. The eye-wear architecture of claim 1, wherein the first frame sequence includes a first plurality of sequential video frames interleaved with a second plurality of sequential video frames to provide a plurality of respective frame pairs that are configured to be perceived as a plurality of respective three-dimensional images.

4. The eye-wear architecture of claim 3, wherein the second frame sequence includes a third plurality of sequential video frames that is configured to be perceived as a plurality of respective two-dimensional images.

5. The eye-wear architecture of claim 3, wherein the second frame sequence includes a third plurality of sequential video frames interleaved with a fourth plurality of sequential video frames to provide a second plurality of respective frame pairs that are configured to be perceived as a second plurality of respective three-dimensional images.

6. The eye-wear architecture of claim 5, wherein the first plurality of sequential video frames and the second plurality of sequential video frames correspond to a first viewpoint of a scene; and
   wherein the third plurality of sequential video frames and the fourth plurality of sequential video frames correspond to a second viewpoint of the scene that is different from the first viewpoint.

7. The eye-wear architecture of claim 5, wherein the first plurality of sequential video frames and the second plurality of sequential video frames correspond to first image content; and
   wherein the third plurality of sequential video frames and the fourth plurality of sequential video frames correspond to second image content that is unrelated to the first image content.

8. A method used to selectively pass first video content and second video content for perception by a user, the method comprising:

receiving, at at least one lens assembly, a video frame sequence from a specified area of a screen within which a first area of the screen and a second area of the screen overlap, the first area of the screen and the second area of the screen having portions that do not overlap, the video frame sequence including a mixture of at least part of a first frame sequence of the first video content and at least part of a second frame sequence of the second video content, the first frame sequence corresponding to the first area of the screen, the second frame sequence corresponding to the second area of the screen;

blocking, using the at least one lens assembly, the at least part of the first frame sequence that is received from the specified area from being perceived by the user, while passing the at least part of the second frame sequence that is received from the specified area to be perceived by the user; and determining, using processing circuitry, that a maturity that is associated with the user is less than a maturity threshold;

wherein blocking the at least part of the first frame sequence while passing the at least part of the second frame sequence is performed in response to determining that the maturity that is associated with the user is less than the maturity threshold.

9. The method of claim 8, wherein receiving the video frame sequence comprises:

receiving, at the at least one lens assembly, frames of the video frame sequence at a predefined rate; and wherein the method further comprises:

synchronizing the at least one lens assembly with the predefined rate to support blocking the at least part of the first frame sequence and passing the at least part of the second frame sequence.

10. The method of claim 9, further comprising:

receiving, at the at least one lens assembly, a synchronization signal from the display system;

wherein synchronizing with the predefined rate comprises:

synchronizing the at least one lens assembly with the predefined rate based on the synchronization signal.

11. The method of claim 8, wherein the first video content is unrelated to the second video content.

12. The method of claim 8, further comprising:

not passing, through at least one speaker assembly, first audio that corresponds to the at least part of the first frame sequence for perception by the user in response to determining that the maturity that is associated with the user is less than the maturity threshold; and passing, through the at least one speaker assembly, second audio that corresponds to the at least part of the second frame sequence for perception by the user in response to determining that the maturity that is associated with the user is less than the maturity threshold;

wherein the second audio is a censored version of the first audio.

13. The eye-wear architecture of claim 1, wherein the second frame sequence is a partially fast forwarded, partially rewound, or paused version of the first frame sequence.

14. The method of claim 8, wherein the second frame sequence is a censored version of the first frame sequence.

15. The method of claim 14, wherein the second frame sequence includes overlays to obscure mature content and the first frame sequence does not include the overlays.

* * * * *

UNITED STATES PATENT AND TRADEMARK OFFICE
CERTIFICATE OF CORRECTION

PATENT NO. : 9,979,954 B2
APPLICATION NO. : 12/982273
DATED : May 22, 2018
INVENTOR(S) : Bennett et al.

Page 1 of 1

It is certified that error appears in the above-identified patent and that said Letters Patent is hereby corrected as shown below:

In the Claims

In Column 17, Line 4, replace "receiving, at at least one" with --receiving, at least one--.

Signed and Sealed this
Twenty-eighth Day of May, 2019

Andrei Iancu
*Director of the United States Patent and Trademark Office*